United States Patent [19]

Karim et al.

[11] 4,276,111

[45] Jun. 30, 1981

[54] BLENDS OF ETHYLENE-ALKYL ACRYLATE COPOLYMERS WITH ROSIN ESTERS

[75] Inventors: Khalid A. Karim; James H. Rea, both of Houston, Tex.

[73] Assignee: Gulf Oil Corporation, Pittsburgh, Pa.

[21] Appl. No.: 173,923

[22] Filed: Jul. 31, 1980

[51] Int. Cl.$^3$ .......................... C09J 7/00; C08L 93/04
[52] U.S. Cl. ................... 156/308.2; 260/27 R; 156/327
[58] Field of Search ............ 260/27 R; 156/327, 308.2

[56] References Cited

U.S. PATENT DOCUMENTS

| | | | |
|---|---|---|---|
| 3,853,606 | 12/1974 | Parkinson | 260/27 R |
| 3,869,416 | 3/1975 | Hoh | 260/27 R |
| 3,936,407 | 2/1976 | Parkinson | 260/27 R |
| 4,192,788 | 3/1980 | Dodson | 260/27 R |
| 4,192,788 | 3/1980 | Dodson | 260/27 R |
| 4,207,220 | 6/1980 | Godfrey | 260/27 R |
| 4,207,220 | 6/1980 | Godfrey | 260/27 R |

FOREIGN PATENT DOCUMENTS 723201  12/1965  Canada .................. 260/27 R

*Primary Examiner*—H. S. Cockeram
*Attorney, Agent, or Firm*—Richard L. Kelly

[57] ABSTRACT

A polymer composition is disclosed and consists essentially of 100 parts by weight of an ethylene-alkyl acrylate copolymer and about 1 to 15 parts by weight of an ester formed from a rosin acid and ethylene glycol, propylene glycol, or glycerine. The polymer compositions have a lower heat sealing temperature than the ethylene-alkyl acrylate copolymer contained therein.

12 Claims, No Drawings

BLENDS OF ETHYLENE-ALKYL ACRYLATE COPOLYMERS WITH ROSIN ESTERS

BACKGROUND OF THE INVENTION

Ethylene-alkyl acrylate copolymers are widely employed in the manufacture of polymer films. In preparing bags, pouches, and the like from such films, the films are heat sealed together under pressure. It would be desirable to seal such films together at lower temperatures than are presently required with ethylene-alkyl acrylate copolymers.

SUMMARY OF THE INVENTION

The applicants have discovered that blends of ethylene-alkyl acrylate copolymers with minor quantities of rosin esters formed from a rosin acid and ethylene glycol, propylene glycol or glycerine are compatible and melt at lower temperatures than the ethylene-alkyl acrylate copolymers. As a consequence, films prepared from such blends can be heat sealed at significantly lower temperatures than those required to heat seal films of the ethylene-alkyl acrylate copolymers contained in such blends.

DETAILED DESCRIPTION OF THE INVENTION

The polymer compositions of the invention consist essentially of 100 parts by weight of the ethylene-alkyl acrylate copolymer and about 1 to 15, preferably about 2 to 12, and more especially about 5 parts by weight of the rosin ester. The polymer compositions can be prepared by any of the common techniques employed in the art to disperse a solid or liquid material into a polymer. This conventionally is done by malaxating the materials on a two-roll rubber mill, or in Banbury mixers, or by extruding the mixture, or by other like techniques.

The ethylene copolymers included in the blends have polymerized therein about 70 to 98, preferably about 78–83, and more especially about 80 weight % of ethylene, with the balance of the copolymer being an alkyl ester of acrylic or methacrylic acid. The alkyl group of the acrylic or methacrylic acid ester may contain from about 1 to 18 carbon atoms, with the preferred esters being the methyl and the ethyl esters. Such copolymers can be prepared by known methods as disclosed, for example in U.S. Pat. No. 3,350,372, the disclosure of which is incorporated herein by reference.

The rosin esters employed in the invention are formed by esterifying a rosin acid with ethylene glycol, propylene glycol (either the 1,2 or the 1,3 isomer), or glycerine. The rosin acid employed will be any of the standard grades sold in commerce; the product sold under the trade designation ACINTOL R Type S being typical of acids satisfactory for use in the present invention. The typical rosin acids sold in commerce are obtained principally from tall oil and will have the following typical analysis:*

| Rosin Acids | 88–92% |
|---|---|
| Rosin Esters and Anhydrides | 4–6% |
| Unsaponifiable Matter | 2–5% |
| Fatty Acids | 1–3% |

*The presence of the minor components causes no difficulties in preparing the esters employed in the invention.

The rosin acids are mixtures of two principal types, the abietic types and the pimaric types. A typical distribution of individual acids found in commercial rosin acids is:

| Rosin Acid | Typical Analysis |
|---|---|
| Abietic Acid | 34% |
| Dehydroabietic Acid | 24% |
| Palustric Acid | 9% |
| Isopimaric Acid | 6% |
| Dihydroabietic Acid | 5% |
| Pimaric Acid | 5% |
| Neoabietic Acid | 3% |

Other individual acids sometimes found and identified in commercial rosin acids include levopimaric acid, tetrahydroabietic acid, sandaracopimaric acid, dihydropimaric acid, tetrahydropimaric acid, dihydroisopimaric acid and tetrahydroisopimaric acid.

The rosin esters will be prepared by esterifying 1 mol of ethylene or propylene glycol with 1 to 2 mols of the rosin acid and by esterifying glycerine with 1 to 3 mols of the rosin acid. The esterification reaction conditions employed are reported in the art. Numerous suitable rosin esters are commercially available, including the glyceryl ester sold under the designation Foral 85.

All of the polymer compositions employed in the work subsequently reported were prepared by adding the polymer and rosin ester to a Brabender Plasticorder operated at approximately 130° C. and 40 rpm. The mixing time was 20 minutes in all cases. Films of each blend having a range of thickness of 2–4 mils were compression molded in a press. Tensile and elongation values were measured for each film.

The films were cut into 1"×2" strips and heat sealed at different temperatures over a range from 150° F. to 250° F. To minimize errors and improve reproducibility, a set of at least three films was sealed at each temperature. The seal strength at each temperature was measured by pulling the samples to the break point in an Instrom Tester. Plots of Seal Strength (in lbs/inch) vs. Seal Temperature in °F. were made for each polymer blend and the ethylene-alkyl acrylate copolymer contained therein. The seal temperature required to obtain a Seal Strength of 2.75 lbs/inch was noted for each sample.

The following examples are set forth to illustrate more clearly the principle and practice of the invention to those skilled in the art. Where parts or percentages are mentioned, they are parts or percentages on a weight basis unless otherwise noted.

EXAMPLE 1

A polymer composition was prepared from 98 parts of a commercially available ethylene-methyl acrylate copolymer having a melt index of 2.4 and containing 20 weight % of the methyl acrylate moiety and 2 parts of a rosin ester formed from 1 mol of rosin acid and 3 mols of glycerine. The ethylene-methyl acrylate copolymer had a tensile strength of 1,900 lbs/psi and an elongation at break of 637%. The blend prepared from the two polymers had a tensile strength of 2,100 psi and an elongation at break of 643%.

Following the experimental procedures previously described, the seal strength of the polymer composition and the ethylene-methyl acrylate copolymer were determined at sealing temperatures from 150° to 250° F. With the ethylene-methylene acrylate copolymer, a seal temperature of approximately 220° F. was required to obtain a seal strength of 2.75 lbs/inch. With the polymer composition, a seal strength of 2.75 lbs/inch was obtained at a seal temperature of approximately 210° F. It is thus seen that the polymer composition has a seal temperature approximately 10° F. lower than the seal temperature of the ethylene-methyl acrylate copolymer contained therein.

EXAMPLE 2

Example 1 was repeated, except that the copolymer and the rosin ester were employed in a 95/5 weight ratio. The polymer composition had a tensile strength of 2,000 psi and an elongation at break of 610%. The polymer composition had a seal strength of 2.75 lbs/inch at a temperature of about 200° F., which is approximately 20° F. lower than the corresponding seal temperature of the ethylene-methyl acrylate copolymer contained in the polymer composition.

In preparing plots of Seal Strength vs. Seal Temperature as previously described, it is noted that the curves for the polymer compositions of the invention rise less steeply than do the curves for the ethylene-alkyl acrylate copolymers. As a consequence, effective heat seals can be obtained over a relatively wide range of sealing temperatures. This characteristic makes temperature control of the heat sealer less critical than is the case with other types of ethylene polymers.

In addition to being useful in the direct manufacture of film, the polymer composition of the invention can be used as one component in the manufacture of the multi-layered coextruded film. Usually the polymer blend will be employed as a surface component to take advantage of its good heat sealing characteristics.

What is claimed:

1. A polymer composition consisting essentially of:
   (a) 100 parts by weight of an ethylene copolymer, and
   (b) About 1 to 15 parts by weight of a rosin ester; said ethylene copolymer having polymerized therein about 70–98 weight % of ethylene and the balance an alkyl ester of acrylic or methacrylic acid; said rosin ester being an ester formed from a rosin acid and ethylene glycol, propylene glycol or glycerine.

2. A composition of claim 1 containing 100 parts by weight of the ethylene copolymer and about 2 to 12 parts by weight of the rosin ester.

3. A composition of claim 1 in which the ethylene copolymer has polymerized therein about 78–83 weight % of ethylene and the balance methyl acrylate.

4. A composition of claim 2 in which the ethylene copolymer has polymerized therein about 78–83 weight % of ethylene and the balance methyl acrylate.

5. A composition of claim 1, 2, 3, or 4 in which the rosin ester is an ester formed from a rosin acid and glycerine.

6. A method for lowering the seal temperature of a film of an ethylene copolymer having polymerized therein about 70 to 98 weight % of ethylene and the balance an alkyl ester of acrylic or methacrylic acid which consists essentially of uniformly dispersing about 1 to 15 parts by weight of a rosin ester in 100 parts by weight of said ethylene copolymer; said rosin ester being an ester formed from a rosin acid and ethylene glycol, propylene glycol, or glycerine.

7. The method of claim 6 in which about 2 to 12 parts of rosin ester are dispersed in the ethylene copolymer.

8. The method of claim 6 in which the ethylene copolymer has polymerized therein about 78–83 weight % of ethylene and the balance methyl acrylate.

9. The method of claim 7 in which the ethylene copolymer has polymerized therein about 78–83 weight % of ethylene and the balance methyl acrylate.

10. In a method for heat sealing two films of an ethylene copolymer having polymerized therein about 70 to 98 weight % of ethylene and the balance an alkyl ester of acrylic or methacrylic acid by heating an assembly of the two films under pressure; the improvement which comprises employing films consisting essentially of said ethylene copolymer having uniformly dispersed therein about 1 to 15 parts by weight of a rosin ester in 100 parts by weight of said ethylene copolymer, whereby the heat sealing temperature of said film is lowered; said rosin ester being an ester formed from a rosin acid and ethylene glycol, propylene glycol, or glycerine.

11. The method of claim 10 in which the ethylene copolymer has polymerized therein about 78–83 weight % of ethylene and the balance methyl acrylate.

12. A film of a polymer composition of claim 1, 2, 3, or 4.

* * * * *